United States Patent
Song et al.

(10) Patent No.: US 8,528,001 B2
(45) Date of Patent: Sep. 3, 2013

(54) CONTROLLING AND DYNAMICALLY VARYING AUTOMATIC PARALLELIZATION

(75) Inventors: Yonghong Song, Palo Alto, CA (US); Spiros Kalogeropulos, Los Gatos, CA (US); Partha P. Tirumalai, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 982 days.

(21) Appl. No.: 12/335,124

(22) Filed: Dec. 15, 2008

(65) Prior Publication Data

US 2010/0153959 A1 Jun. 17, 2010

(51) Int. Cl.
*G06F 9/46* (2006.01)

(52) U.S. Cl.
USPC .......................................... 718/107; 718/104

(58) Field of Classification Search
None
See application file for complete search history.

(56) References Cited

U.S. PATENT DOCUMENTS

| | | | |
|---|---|---|---|
| 6,651,246 B1 | 11/2003 | Archambault et al. | |
| 6,654,954 B1 | 11/2003 | Hicks | |
| 6,880,045 B2 | 4/2005 | Pong et al. | |
| 6,938,130 B2 | 8/2005 | Jacobson et al. | |
| 7,395,531 B2 | 7/2008 | Eichenberger et al. | |
| 7,426,724 B2 | 9/2008 | Kilgard et al. | |
| 7,530,069 B2 | 5/2009 | Kawahara et al. | |
| 7,543,282 B2 | 6/2009 | Chou | |
| 7,818,729 B1 | 10/2010 | Plum et al. | |
| 7,853,934 B2 | 12/2010 | Partamian | |
| 2003/0041086 A1* | 2/2003 | Lankreijer | 709/102 |
| 2004/0049667 A1 | 3/2004 | McCormick et al. | |
| 2004/0199919 A1* | 10/2004 | Tovinkere | 718/102 |
| 2006/0026575 A1 | 2/2006 | Cabillic et al. | |
| 2006/0026580 A1 | 2/2006 | Cabillic et al. | |
| 2007/0050762 A1 | 3/2007 | Chen et al. | |
| 2008/0163185 A1 | 7/2008 | Goodman | |
| 2008/0250422 A1* | 10/2008 | Lewis | 718/107 |
| 2010/0138571 A1* | 6/2010 | Cain et al. | 710/56 |
| 2010/0269102 A1* | 10/2010 | Latorre et al. | 717/130 |

OTHER PUBLICATIONS

Song, Y., et al; "Design and Implementation of a Compiler Framework for Helper Threading on Multi-Core Processors;" IEEE PACT 2005, (Sep. 2005); pp. 99-109.

Damron, P., et al; "Hybrid Transactional Memory"; ASPLOS XII; San Jose, CA (2006); http://www.princeton.edu/~asplos06/tprogram.html.

(Continued)

*Primary Examiner* — Emerson Puente
*Assistant Examiner* — Dong Kim
(74) *Attorney, Agent, or Firm* — Roy D. Rankin; Meyertons, Hood, Kivlin, Kowert & Goetzel, P.C.

(57) ABSTRACT

A system and method for automatically controlling run-time parallelization of a software application. A buffer is allocated during execution of program code of an application. When a point in program code near a parallelized region is reached, demand information is stored in the buffer in response to reaching a predetermined first checkpoint. Subsequently, the demand information is read from the buffer in response to reaching a predetermined second checkpoint. Allocation information corresponding to the read demand information is computed and stored the in the buffer for the application to later access. The allocation information is read from the buffer in response to reaching a predetermined third checkpoint, and the parallelized region of code is executed in a manner corresponding to the allocation information.

18 Claims, 4 Drawing Sheets

(56) References Cited

OTHER PUBLICATIONS

Su, F, et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

"Design and Evaluation of Dynamic Optimizations for a Java Just-in-Time Compiler", Suganuma, et al., Jul. 2005, pp. 732-785, http://delivery.acm.org/10.1145/1080000/10753861p732-suganuma.pdf.

"Compiler Optimization of Embedded Applications for an Adaptive SoC Architecture", Hardnett, et al., Oct. 2006, pp. 312-322, http://delivery.acm.org/10.1145/1180000/11767981p312-hardnett.pdf.

"Dynamic Code Management: Improving Whole Program Code Locality in Managed Runtimes", Huang, et al., Jun. 2006, pp. 133-143, http://delivery.acm.org/10.1145/1140000/1134779/p133-huang.pdf.

"ACME: Adaptive Compilation Made Efficient", Cooper, et al., Jul. 2005, pp. 69-77, http://delivery.acm.org/10.1145/1070000/1065921/p69-cooper.pdf.

* cited by examiner

CONTROLLING AND DYNAMICALLY VARYING AUTOMATIC PARALLELIZATION

BACKGROUND OF THE INVENTION

1. Field of the Invention

This invention relates to computer systems, and more particularly, to automatically controlling run-time parallelization of a software application.

2. Description of the Relevant Art

The performance of computer systems is dependent on both hardware and software. As generating performance from hardware design becomes increasingly difficult, attention turns to new methods of software design. For example, regarding the hardware of a system, the geometric dimensions of devices and metal routes on each generation of semiconductor chips continue to decrease. This reduction leads to increases in cross capacitance effects on wires, parasitic inductance effects on wires, and electrostatic field effects within transistors, which increase the circuit noise effects on-chip and propagation delays. In addition, the number of nodes that may switch per clock cycle significantly increases as more devices are used in each new generation. This trend leads to an increase in power consumption with each new generation of processors. The operational frequency is limited by these noise and power effects, which may limit the performance of the hardware. However, the reduction in geometric dimensions on-chip also allows for larger caches and multiple cores to be placed on each processor in order to increase performance.

Attention turns to software as programmers may not be able to rely on ever-faster hardware to hide inefficient code and as the need to generate performance from applications executed on multi-core chips increases. Automatic parallelization has been well studied in the past. Automatic parallelization seeks to parallelize sequential programs such that the resulting executable(s) may have improved performance on multi-threaded machines. Little or no parallelization effort is required from the user as most of the work is done by the compiler and an accompanying runtime library.

Until recently, static, compiler-based, automatic parallelization had been used mainly by scientists and engineers to parallelize their applications and execute them on large and often specialized systems. This user community had deep knowledge and exercised control over the applications and the systems on which they were executing. Two trends are broadening this usage pattern. First, multi-threaded processor machines are rapidly becoming commonplace. These systems will have lots of hardware threads but are not expected to run at much higher clock frequencies. Second, techniques for automatic parallelization have been advancing.

Unlike many other multi-threading paradigms, in order to achieve good performance automatically parallelized programs often require special scheduling called "gang scheduling" wherein all threads should be scheduled as a single group. This poses a problem on an over-subscribed system when there are more ready-to-run software threads compared to available hardware thread contexts, or if not all threads or groups of threads are equal.

There is also the question of how many threads to exploit when executing an application. In some systems, the number of threads to be used by an automatically parallelized application is determined by the user at the start of the application. Different executions may use different numbers of threads.

Other systems, including parallelization standards such as OpenMP (a specification for parallel programming), allow more control. Here, to schedule and run the optimal number of threads on a shared, potentially over-subscribed system, the application, or a corresponding runtime parallelization library may query the operating system about the state of the machine before entering a parallel region. Based on the information returned, the application decides how many threads to use. However, such an approach needs one or more queries to the operating system, and often consumes thousands of cycles.

In view of the above, efficient methods and mechanisms for automatically controlling run-time parallelization of a software application are desired.

SUMMARY OF THE INVENTION

Systems and methods for automatically controlling run-time parallelization of a software application are contemplated.

In one embodiment, a system comprises a memory configured to store instructions of a plurality of threads within a software application. The application itself or a corresponding runtime library is configured to allocate a buffer, store demand information in the buffer in response to reaching a predetermined first checkpoint, read allocation information from the buffer in response to reaching a predetermined third checkpoint, and execute a parallelized region of code in a manner corresponding to the allocation information.

A supervising entity, which may be an operating system, reads the demand information from the buffer in response to reaching a predetermined second checkpoint, computes the allocation information corresponding to the read demand information, and store the allocation information in the buffer for the application to later access.

In another embodiment, a method is configured to allocate a buffer during execution of program code of an application. When a point in program code near a parallelized region is reached, demand information is stored in the buffer in response to reaching a predetermined first checkpoint. Subsequently, the demand information is read from the buffer in response to reaching a predetermined second checkpoint. Allocation information corresponding to the read demand information is computed and stored in the buffer for the application to later access. The allocation information is read from the buffer in response to reaching a predetermined third checkpoint, and the parallelized region of code is executed in a manner corresponding to the allocation information.

In yet another embodiment, a computer readable storage medium is provided that stores program instructions operable to automatically control run-time parallelization of a software application. The program instructions are executable to perform the steps described above regarding a method.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
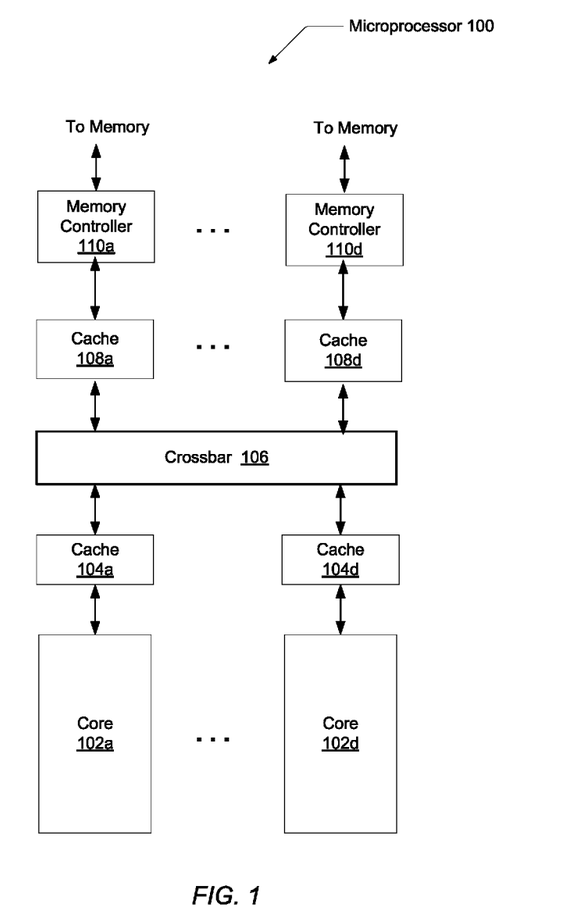
FIG. 1 is a generalized block diagram illustrating one embodiment of a multi-core microprocessor.

Referring to FIG. 1, one embodiment of a multi-core microprocessor 100 is shown. Microprocessor 100 may have multiple cores 102a-102d. As used herein, elements referred to by a reference numeral followed by a letter may be collectively referred to by the numeral alone. For example, cores 102a-102d may be collectively referred to as cores 102. Each core 102 may include a superscalar microarchitecture with one or more multi-stage pipelines. Each core 102 may be configured to execute instructions of software applications corresponding to an instruction set architecture (ISA) such as x86, SPARC, PowerPC, MIPS, ARM, or other. Also, each core 102 may be designed to execute multiple strands, or threads. For example, a multi-thread software application may have each of its software threads scheduled to be executed on a separate pipeline within a core 102, or alternatively, a pipeline may process multiple threads via control at certain function units. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 210 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

A multi-thread software application may be written by a designer to be executed on a multi-core processor, such as the one in FIG. 1, or on a multi-processor chip. The multi-thread program needs to be compiled prior to execution on a system such as microprocessor 100.

A compiler is a set of programs for translating source code, such as a multi-thread software program, into another computer language, or target code. The source code may be software applications written by a designer in a high-level language such as C, C++, Fortran, or other. The target code may be machine code. Machine code is a general term that refers to patterns of bits with different patterns corresponding to different commands, or instructions, to the machine, or processor, and to the operating system. This source code may be stored on a computer readable medium. A command instruction, which may be entered at a prompt by a user, with any necessary options may be executed in order to compile the source code.

Most modern compilers may be split into a number of relatively independent phases, or passes. Separate phases allow one or more phases to be later improved or replaced, and additional phases may later be inserted to permit additional optimizations. Although modern compilers have two or more phases, these phases are usually regarded as being part of the front-end or the back-end. There is not a hard boundary of responsibilities between these two phases. An advantage of splitting the front-end of a compiler from the back-end is front-ends for different languages may be combined with back-ends for different processors. Generally speaking, the front-end performs syntactic and semantic processing and translates the source code to a lower-level of representation. Optimizations may be performed on the lower-level representation. The independence provided by this representation of the source code from the machine code allows generic optimizations to be shared between versions of the compiler.

The back-end compiler takes the output from the front-end compiler and performs more analysis, transformations, and optimizations for a particular hardware platform. Basic components of a back-end compiler may include a preprocessor for receiving the lower-level representation from the front-end and dividing instructions into basic components, an optimizer for performing transformations and optimizations after analysis of the lower-level representation, and a code generator for conveying bit-wise machine code as an output to a particular processor and operating system (OS). The back-end may perform more transformations and optimizations for a particular computer architecture and processor design. For example, a processor is designed to execute instructions of a particular instruction set architecture (ISA), but the processor may have one or more processor cores. The manner in which a software application is executed (block 208) in order to reach peak performance may differ greatly between a single-, dual-, or quad-core processor. Other designs may have eight cores. Regardless, the manner in which to compile the software application in order to achieve peak performance may need to vary between a single-core and a multi-core processor.

One optimization that may be performed at this step is automatic parallelization. Loops with an iteration count that can be determined by a compiler before the loop is executed and has an unchanging loop index is referred to as a countable loop. Countable loops may have each loop iteration executed simultaneously. Traditional automatic parallelization tries to parallelize loops which do not have cross-iteration dependencies, wherein all loop iterations may be executed at the same time. Most automatic parallelization is implemented with a fork-join model. The main, or Master, thread will fork a set of N-1 other threads, or slave threads, wherein N is an integer value, such that the work in the parallel loop will be shared amongst all N threads. The thread management and work partitioning tasks are often processed in a separate parallelization library (PL).

The task of spawning and terminating threads, as well as scaling the number of threads according to the number of available processors or processor cores, may be performed by code referred to as a parallelization library (PL). The back-end compiler may expose parallel constructs such as a "for" or a "while" loop by replacing the code in the lower-level representation with method or function calls defined in a PL. These function calls may include a call for a main thread, or a Master thread. The main thread includes codes to communicate and synchronize with slave threads.

The PL will apply a scheduling policy, which may be determined and passed in by the back-end compiler, to partition work among multiple threads. As one skilled in the art is aware, there are many different scheduling policies. The most common scheduling policy is called "static" scheduling, which tries to distribute original work evenly across all Slave threads.

The following example gives a simplified view of back-end compiler code generation and interaction between the back-end compiler and the PL. Suppose a designer has written source code that contains the below code segment now present in a lower-level representation following front-end compilation,

```
for (i = 1; i <= n; i++) {            /* line 1 */
    a[i] = b[i] + foo (i);
}
```

The compiler may replace the above original code with the following:

```
/* Parameters to pass to parallelization library */     /* line 4 */
    parameters.lower = 1;
    parameters.upper = n;
    parameters.step = 1;
    parameters.outlined_func = _outlined_$func_;
    /* pass in arguments for the outlined routine */
    pass_in_argvs[0] = a;                               /* line 10 */
    pass_in_argvs[1] = b;
    _MasterFunc_ (&parameters, pass_in_argvs, ...)
```

The function call "_outlined_$func_" is the outlined function for the original loop. The Main thread may copy "pass-in" values of the index variables and local variables in a per-Slave-thread data structure, followed by activating waiting Slave threads. A determination of the number of waiting Slave threads to execute may be determined without expensive queries to the OS as will be described shortly. Each Slave thread may then execute an outlined function. The function call "_outlined_$func_" is stored in the same object file as where the original loop is stored, and it may contain the following:

```
_outlined_$func_ (pass_in_argvs, lower, upper, ...)    /* line 13 */
    copy_in_a = pass_in_argvs[0];
    copy_in_b = pass_in_argvs[1];                       /* line 15 */
    for (private_i = lower; private_i <= upper; private_i++) {
        copy_in_a[private_i] = copy_in_b[private_i] + foo (private_i);
    }
```

The function call "_MasterFunc_" is defined in the parallelization library (PL). It will partition the original work among multiple Slave threads, and also handle synchronization between different threads.

Figure 2:
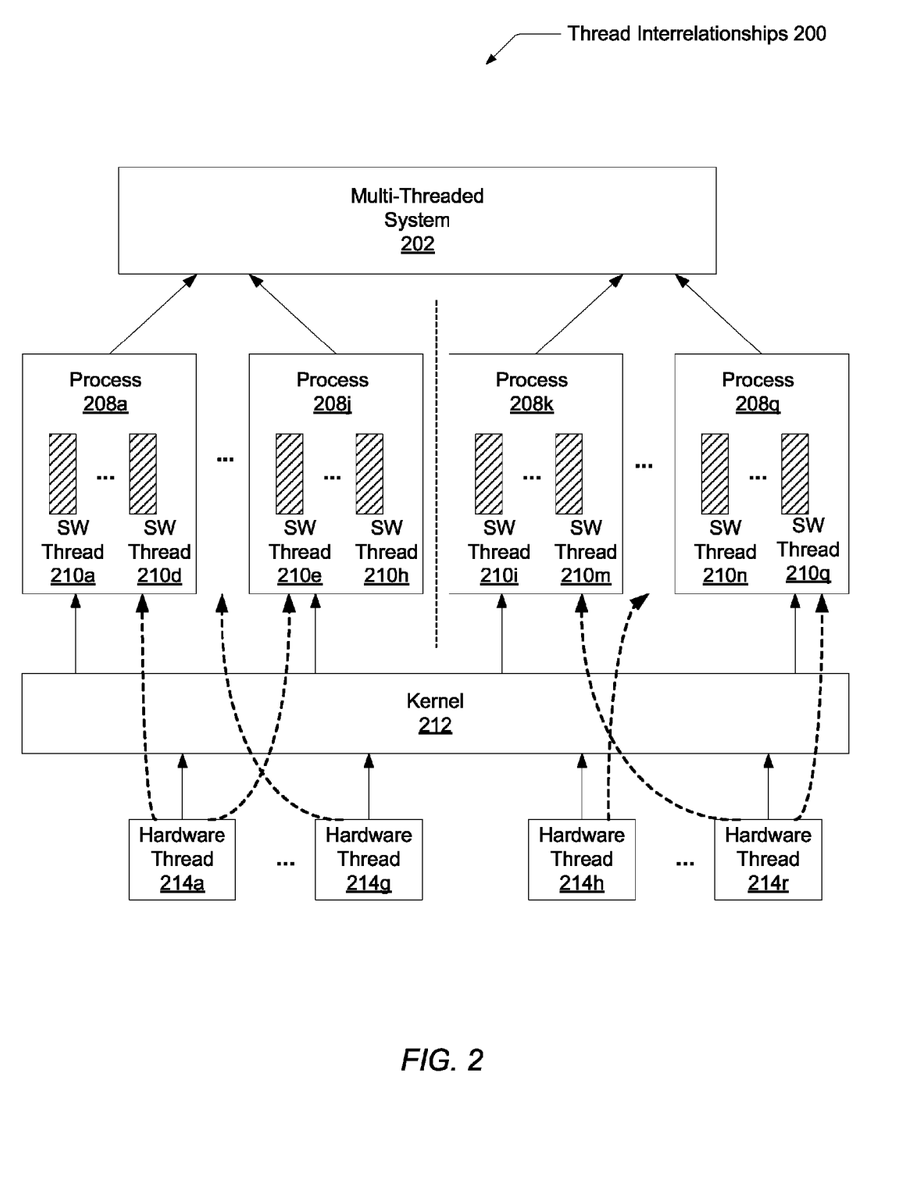
FIG. 2 is a generalized block diagram illustrating one embodiment of hardware and software thread interrelationships.

FIG. 2 illustrates one embodiment of hardware and software thread interrelationships 200 is shown. Here the partitioning of hardware and software resources and their interrelationships during the execution of one or more applications is shown. In one embodiment, the operating system on the nodes in multi-processor system 202, which may, for example, reprise the resources of system 100 and/or 170, allocates regions of memory for the transaction spaces 204a-204k. In one embodiment, the software maintains which regions of the transaction spaces 204 are available for the execution of transactions 206 and handles the condition wherein insufficient space is available for transaction execution.

When applications, or computer programs, execute, each application may comprise multiple processes, such as Processes 208a-208j and 208k-208q in FIG. 2. In such an embodiment, each process 208 may own its own resources such as an image of memory, or an instance of instructions and data before application execution. Also, each process 208 may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Multi-processor system 202 typically supports many processes. Within each of the processes 208 may be one or more software threads. For example, Process 208a comprises SW Threads 210a-210d. A thread can execute independent of other threads within its corresponding process and a thread can execute concurrently with other threads within its corresponding process.

Generally speaking, each of the threads 210 belongs to only one of the processes 208. Therefore, for multiple threads of the same process, such as SW Thread 210a-210d of Process 208a, the same data content of a memory line, for example the line of address 0xff38, will be the same for all threads. This assumes the inter-thread communication has been made secure and handles the conflict of a first thread, for example SW Thread 210a, writing a memory line that is read by a second thread, for example SW Thread 210d. However, for multiple threads of different processes, such as SW Thread 210a in Process 208a and SW Thread 210e of Process 208j, the data content of memory line with address 0xff38 will more than likely be different for the threads. However, multiple threads of different processes may see the same data content at a particular address if they are sharing a same portion of address space.

In general, for a given application, kernel 212 sets up an address space for the application, loads the application's code into memory, sets up a stack for the program, branches to a given location inside the application, and begins execution of the application. Kernel 212 may further determine a course of action when insufficient memory is available for the execution of the application. As stated before, an application may be divided into more than one process and network 202 may be running more than one application. Therefore, there may be several processes running in parallel. Kernel 212 may decide at any time which of the simultaneous executing processes should be allocated to the processor(s). Kernel 212 may allow a process to run on a core of a processor, which may have one or more cores, for a predetermined amount of time referred to as a time slice.

In one embodiment, only one process can execute at any time per processor core, CPU thread, or Hardware Thread. In FIG. 2, Hardware Threads 214a-214g and 214h-214r comprise hardware that can handle the execution of the one or more threads 210 within one of the processes 208. This hardware may be a core, such as core 102, or a subset of circuitry within a core 102 configured to execute multiple threads. Microprocessor 100 may comprise one or more cores. Although this hardware resides within a microprocessor 100 which resides within system 202, hardware threads 214 are shown outside of system 202 for illustrative purposes of assignments made by kernel 212. The dashed lines in FIG. 2 denote assignments and do not necessarily denote direct physical connections. Thus, for example, Hardware Thread 214*a* may be assigned for Process 208*a*. However, later (e.g., after a context switch), Hardware Thread 214*a* may be assigned for Process 208*j*.

In one embodiment, an ID is assigned to each of the Hardware Threads 214. This Hardware Thread ID, not shown in FIG. 2, but is further discussed below, is used to assign one of the Hardware Threads 214 to one of the Processes 208 for process execution. Kernel 212 typically handles this assignment. For example, similar to the above example, a Hardware Thread ID may be used to assign Hardware Thread 214*r* to Process 208*k*. This assignment is performed by kernel 212 prior to the execution of any applications.

In one embodiment, system 202 may comprise 4 microprocessors, such as microprocessor 100, wherein each microprocessor may comprise 2 cores, such as cores 102. Then system 202 may be assigned HW Thread IDs 0-7 with IDs 0-1 assigned to the cores of a first microprocessor, IDs 2-3 assigned to the cores of a second microprocessor, etc. HW Thread ID 2, corresponding to one of the two cores in processor 204*b*, may be represented by Hardware Thread 214*r* in FIG. 2. As discussed above, assignment of a Hardware Thread ID 2 to Hardware Thread 214*r* may be performed by kernel 212 prior to the execution of any applications. Later, as applications are being executed and processes are being spawned, processes are assigned to a Hardware Thread for process execution. For the soon-to-be executing process, for example, Process 208*k* in FIG. 2, an earlier assignment performed by kernel 212 may have assigned Hardware Thread 214*r*, with an associated HW Thread ID 2, to handle the process execution. Therefore, in FIG. 2, a dashed line is shown to symbolically connect Hardware Thread 214*r* to Process 208*k*. Accordingly, in this example, one of two cores in processor 204*b* of FIG. 2 will handle the execution of Process 208*k*.

Later, a context switch may be requested, perhaps due to an end of a time slice. At such a time, Hardware Thread 214*r* may be re-assigned to Process 208*q*. In such a case, data and state information of Process 208*k* is stored by kernel 212 and Process 208*k* is removed from Hardware Thread 214*r*. Data and state information of Process 208*q* may then be restored to Hardware Thread 214*r*, and process execution resumes.

Figure 3:
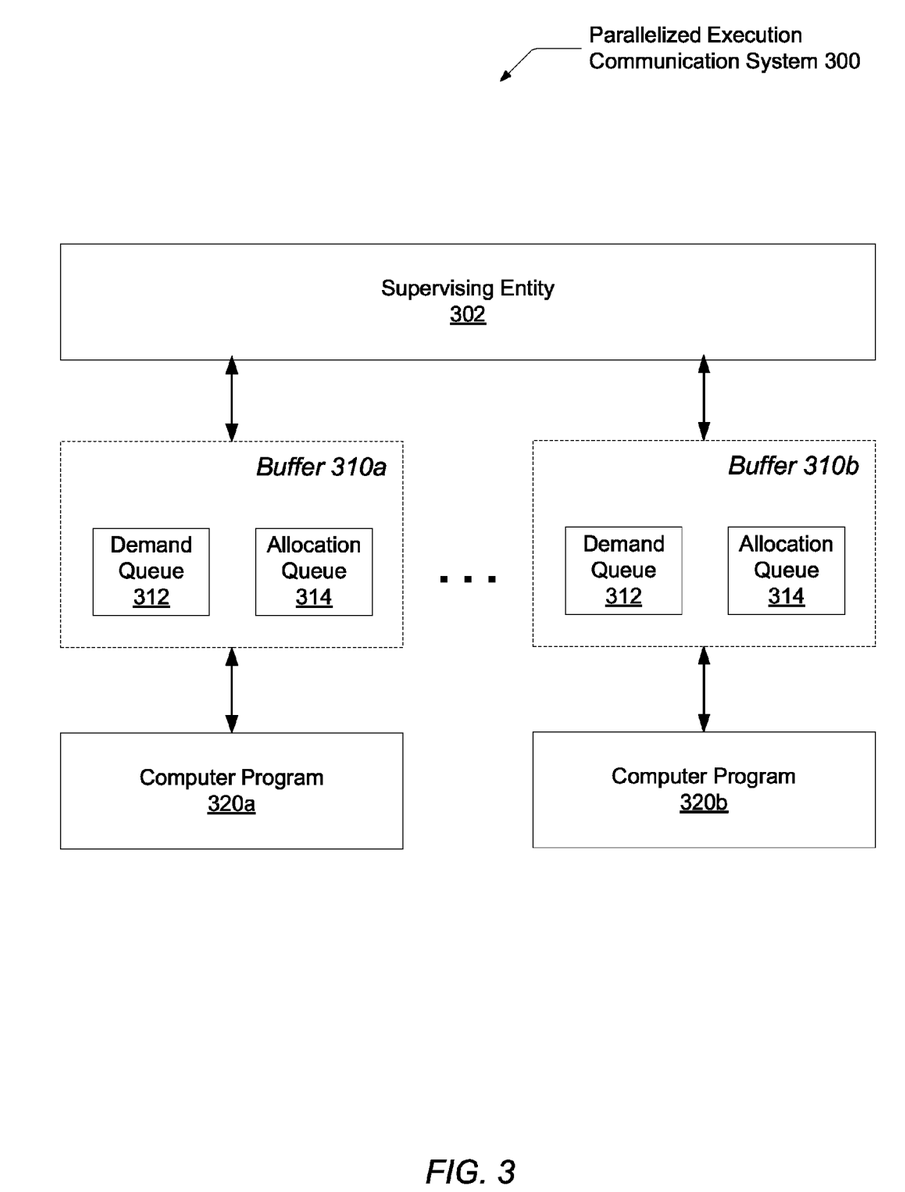
FIG. 3 is a generalized block diagram illustrating one embodiment of a communication system for controlling parallelization execution.

Turning now to FIG. 3, one embodiment of a communication system 300 for controlling parallelization execution is shown. System 300 may provide an efficient asynchronous scheme for communication between a user computer program 320, and its corresponding runtime library, and an operating system, or a corresponding supervising entity 302. The asynchronous scheme may be used to exchange information needed for effective dynamic parallelization control. A supervising entity 302, which may be an operating system (OS) in one embodiment, manages and coordinates the activities of the executing computer programs 320 on hardware not shown, such as one or more microprocessors. In another embodiment, supervising entity 302 may be a separate computer program configured to be an interface between computer programs 320 and an operating system.

Also, entity 302 may control the sharing of the resources of the hardware, which relieves the software programmers from having to manage these details and makes it easier to write applications, such as computer programs 320. In another embodiment, supervising entity 302 may be a separate program or daemon that helps to balance the load among the parallel applications executing on the system. Such a program may also accept commands to change policies from an administrator. This may also help deployment. If a supervising program may be supplied with the functionality of supervising entity 302, then the OS itself need not be modified.

During program execution, one or more buffers 310 may be allocated in memory. In one embodiment, each executing computer program 320 or its corresponding runtime library may allocate one corresponding buffer 310 for the program's use. The computer program 320 or corresponding runtime library may allocate a buffer 310 whose format and address will be passed to the supervising entity 302 in order that entity 302 is able to read from and write to buffer 310.

In one embodiment, each buffer 310 may comprise a demand queue 312 and an allocation queue 314. These queues may be separate portions within buffer 310, they may be interleaved entries, or each entry contains information regarding the demand queue 312 in a first portion and regarding the allocation queue 314 in a second portion. Other implementations are possible and contemplated. The demand queue 312 may be configured to store computer program 320 generated demand information. During execution, computer program 320 may dynamically calculate or estimate, based on instrumented code by a compiler, various pieces of information such as the number of threads it may profitably use, the preferred relative placements of the threads, the size of the parallel region, total number of storage elements such as flip-flops, flip-flop density, amount of input/output (I/O) signals, amount of memory required for the parallel region, or other. In one embodiment, computed loop indexes used in "for" and "while" loop constructs may be used to determine the size of a matrix requiring parallel execution. Such information may be useful. For example, in some complex architectures, multiple cores or threads may be sharing a floating point unit (FPU) and if high flip-flop density threads are mapped to a same FPU, performance may greatly reduce. Then program 320 may store this information in the demand queue 312. Each entry of demand queue 312 may comprise at least a valid bit, a region ID, a requested number of threads, and a preferred assignment for each thread (i.e. SW Thread 4 assigned to HW Thread 2). Each entry of allocation queue 314 may comprise at least a valid bit, a region ID, an allocated number of threads, and an allocated assignment for each thread. In one embodiment, both queues 312 and 314 may comprise only a single entry, and, therefore, do not require a region ID.

Another optimization that may be performed by the compiler is augmenting the source code with additional instructions at a location in the code before an identified parallel region. Identifying a parallel region may comprise detecting one or more of the following: a "for" or "while" loop construct, a user-specified directive such as OpenMP, a first function call with no data dependencies on a second function call, and a first basic block with no data dependencies on a second basic block. Then demand information to be stored in demand queue 312 may be determined by the compiler. The size of the parallel region may be determined from a computed loop index(es), which may be used to determine a requested number of threads to use. A more complex computation may also include determining the number of storage elements required in the parallel region, determining if the parallel region includes complex instructions, estimating the amount of memory required by the parallel region, or other. This data may also be stored in the demand queue 312. A corresponding store or write instruction(s) may be augmented in the source code for this purpose.

Following, a load or read instruction may be augmented in the source code to read the contents of allocation queue 314. The use of the load and store instructions, rather than system calls, may allow subsequent execution of the instrumented source code to bypass the expensive penalty of system call queries to an operating system for determining a number of threads to use for parallel regions. There is no waiting for a response from the operating system when the augmented load and store instructions are utilized. This asynchronous approach may increase performance although allocation information from a previous parallel region may be used.

Computation instructions may be augmented in the source code following the load instruction. The computation instructions may use both the requested number of threads sent to the demand queue 312 and the allocation number of threads read from the allocation queue 314 to determine a final parallelization number of threads to use. This final value may be an average of the other two values or another algorithm may be used to determine the final value. Finally, code may be augmented to the software application to pass the final chosen values to a parallelization or runtime library.

Figure 4:
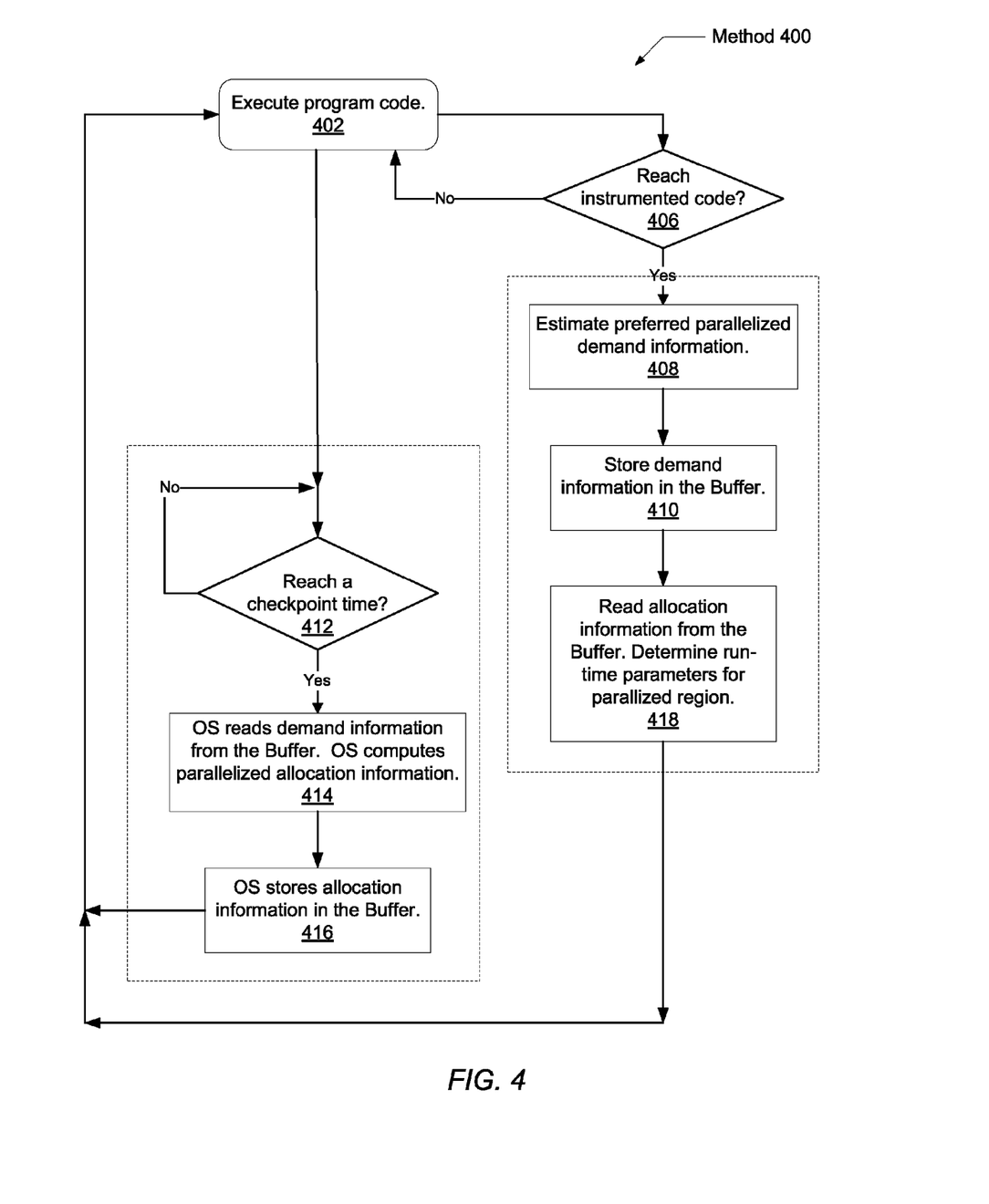
FIG. 4 is a flow diagram illustrating one embodiment of a method for automatically controlling run-time parallelization of a software application.

Turning now to FIG. 4, one embodiment of a method 400 for automatically controlling run-time parallelization of a software application is shown. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, source code has been compiled, instrumented for automatic control of run-time parallelization, and execution of the code has begun in block 402. It is noted that control flow from block 402 may move to both conditional block 406 and to conditional block 412 simultaneously. Accordingly, in one embodiment, method 400 may simultaneously move through the blocks on both the left (i.e. 412, 414, and 416) and the right (i.e. 408, 410, and 418). In one embodiment, the blocks on the left may correspond to the actions of a supervising entity.

A buffer, such as an asynchronous information exchange buffer (AIEB), may be allocated by instrumented code. In one embodiment, the AIEB may be allocated early in program execution. In another embodiment, the AIEB may not be allocated until a first parallel region is encountered. This AIEB may reprise the implementation of buffer 310 in FIG. 3. In one embodiment, the software application corresponding to the program code allocates the AIEB. In one embodiment, the AIEB may be in the software application's address space, and, therefore, simple load and store operations may be used for the program code to read from and write to the AIEB. Again, the format and address of the AIEB may be passed to a supervising entity 302, such as an operating system, in order that entity 302 is able to read from and write to the AIEB. Initially, all data in the AIEB may be marked invalid.

When instrumented code is reached due to a parallel region (conditional block 406), the program code calculates or estimates preferred parallelized demand information in block 408. In one embodiment, demand information that was estimated or computed in block 408 may comprise at least a requested number of threads to be profitably used in a parallel region, a preferred assignment or relative placement for each thread (i.e. SW Thread 4→HW Thread 2), or other. In one embodiment, in block 410, the demand information is stored in a demand queue 312 within the AIEB.

In block 418, an instrumented load or read instruction in the computer program 320 will read the allocation information from the corresponding allocation queue 314 within AIEB. If the data read is valid, the information may be used to determine run-time parameters for a parallelized region such as the number of threads to invoke when executing in parallel. As the AIEB is in the application's address space, simple loads and stores are sufficient to perform accesses to the AIEB and no expensive system calls are necessary.

In another embodiment, selection logic may be used to provide the resulting parallelization information to a parallelization or runtime library within computer program 320. For example, if a computer program 320 placed a request for 24 threads in its corresponding demand information, and the supervising entity earlier had determined and stored information corresponding to that 16 threads is the estimated allocation, then the selection logic may determine an intermediate value (e.g. 18, 20, 22) of threads may be used within the computer program 320. A scheduling policy may be used that is biased toward the requesting application or toward the supervising entity. Also within an under-subscribed system, the scheduling policy does need to know the number of threads that may be profitably used. If the application can profitably use only 24 threads, then, even if 75 threads are available, the policy may choose to only use 24 threads.

Simultaneously, while the computer program 320 is executing, the supervising entity 302 periodically checks an AIEB for each application or checks one AIEB for all applications that has been launched. The checks may be triggered at various points such as on a timely basis (e.g., 1 ms), when a new process is ready to run, when a process will be destroyed, when the number of available hardware threads is changed, or other. When such a second checkpoint is reached (conditional block 412), the supervising entity 302 reads the demand information from the AIEB.

In block 414, the entity 302 uses the demand information along with other factors to compute allocation for an application. Other factors and external control information that may be utilized in addition to the demand information for allocation computing may include the corresponding process state, the corresponding program counter, the microprocessor scheduling information for the process, memory management information regarding the process, process accounting information for this process, input/output (I/O) status information of the process, scheduling policy information, or other. The supervising entity 302 then writes allocation information values to the corresponding allocation queue of the AIEB in block 416.

Method 400 may be modified, in one embodiment, by an executable command to increase or decrease the parallelism previously granted to an application. The asynchronous approach of method 400 may get out of sync if the software application's demand varies widely and frequently from parallel region to parallel region. However, a policy may be used wherein frequent changes are detected and slowed down. For example, demand updates may be disallowed within a specified time period such as 10 ms. If necessary, the software application or runtime library may have an option to select between the two methods. Method 400 may reduce overhead significantly compared to previous synchronous query based methods.

Various embodiments may further include receiving, sending or storing instructions and/or data implemented in accordance with the above description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer readable storage medium storing program instructions operable to automatically control run-time parallelization of a multi-threaded software application, wherein the program instructions are executable to:
   analyze program instructions of the multi-threaded software application;
   identify a parallel region within program instructions of the multi-threaded software application;
   instrument the software application with instructions executable to:
      allocate a buffer in memory for communication between the software application and an operating system;
      pass a format and address of the buffer to the operating system, thereby enabling the operating system to read from and write to the buffer;
      store preferred resource requests from the software application in the buffer, wherein resources are used for executing the identified parallel region;
      read resource availability from the buffer, said resource availability having been stored in the buffer by the operating system, wherein the resource availability is associated with the preferred resource requests; and
      determine run-time resources for use in executing the parallel region based at least in part on the resource availability read from the buffer, wherein the instructions are executable to obtain the operating system provided resource availability from the buffer without a system call to the operating system.

2. The storage medium as recited in claim 1, wherein the resource availability and run-time resources include information corresponding to the preferred resource requests, and wherein during execution of the application:
   preferred resource requests are read from the buffer by the operating system, in response to detecting an allocation checkpoint;
   resource availability corresponding to the read preferred resource requests is computed by the operating system and stored in the buffer; and
   run-time resources for use in executing the parallel region are determined by the software application based at least in part on resource availability read from the buffer.

3. The storage medium as recited in claim 2, wherein determining the run-time resources comprises computing an average of one or more numbers of resources in the preferred resource requests and one or more associated numbers of resources in the resource availability.

4. The storage medium as recited in claim 3, wherein the preferred resource requests and the resource availability are associated with one another by a parallel region identifier, wherein the one or more numbers of resources for each includes one or more of the following: a requested number of threads and a preferred assignment for each thread.

5. The storage medium as recited in claim 2, wherein determining the allocation checkpoint by the operating system comprises detecting at least one of the following: a predetermined cyclic time duration, when a new process is ready to execute, when a process is ready to be terminated, and when the number of available hardware threads is changed.

6. The storage medium as recited in claim 5, wherein computing the resource availability comprises utilizing one or more of the following: scheduling policy, process state, and process memory management information.

7. The storage medium as recited in claim 1, wherein identifying a parallel region comprises detecting one or more of the following: a loop construct instruction, a user-specified directive, a first function call with no data dependencies on a second function call, and a first basic block with no data dependencies on a second basic block.

8. A method comprising:
   analyzing program instructions of a multi-threaded software application;
   identifying a parallel region within program instructions of the multi-threaded software application; and
   instrumenting the software application with instructions executable to:
      allocate a buffer in memory for communication between the software application and an operating system;
      pass a format and address of the buffer to the operating system, thereby enabling the operating system to read from and write to the buffer;
      store preferred resource requests from the software application in the buffer, wherein resources are used for executing the identified parallel region;
      read resource availability from the operating system from the buffer, said resource availability having been stored in the buffer by the operating system, wherein the resource availability is associated with the preferred resource requests; and
      determine run-time resources for use in executing the parallel region based at least in part on the resource availability read from the buffer, wherein the operating system provided resource availability is obtained from the buffer without a system call to the operating system.

9. The method as recited in claim 8, wherein the resource availability and run-time resources include information corresponding to the preferred resource requests, and wherein during execution of the application the method further comprises:
   reading preferred resource requests from the buffer, in response to determining an allocation checkpoint;
   computing resource availability corresponding to the read preferred resource requests; and
   determining run-time resources for use in executing the parallel region based at least in part on the resource availability read from the buffer.

10. The method as recited in claim 9, wherein determining the run-time resources comprises computing an average of one or more numbers of resources in the preferred resource requests and one or more associated numbers of resources in the resource availability.

11. The method as recited in claim 10, wherein the preferred resource requests and the resource availability are associated with one another by a parallel region identifier, wherein the one or more numbers of resources for each includes one or more of the following: a requested number of threads and a preferred assignment for each thread.

12. The method as recited in claim 9, wherein determining the allocation checkpoint comprises detecting at least one of the following: a predetermined cyclic time duration, when a new process is ready to execute, when a process is ready to be terminated, and when the number of available hardware threads is changed.

13. The method as recited in claim 12, wherein computing the resource availability comprises utilizing one or more of the following: scheduling policy, process state, and process memory management information.

14. The method as recited in claim 8, wherein identifying a parallel region comprises detecting one or more of the following: a loop construct instruction, a user-specified directive, a first function call with no data dependencies on a second function call, and a first basic block with no data dependencies on a second basic block.

15. A computer system comprising:
   a processor;
   a compiler comprising:
   code generation instructions executable by the processor; and
   optimization instructions executable by the processor to:
      analyze program instructions of a multi-threaded software application;
      identify a parallel region within program instructions of the multi-threaded software application;
      instrument the software application with instructions executable to:
      allocate a buffer in memory for communication between the software application and an operating system;
      pass a format and address of the buffer to the operating system, thereby enabling the operating system to read from and write to the buffer;
      store preferred resource requests from the software application in the buffer, wherein resources are used for executing the identified parallel region;
      read resource availability from the operating system from the buffer, said resource availability having been stored in the buffer by the operating system, wherein the resource availability is associated with the preferred resource requests; and
      determine run-time resources for use in executing the parallel region based at least in part on the resource availability read from the buffer, wherein the operating system provided resource availability is obtained from the buffer without a system call to the operating system.

16. The system as recited in claim 15, wherein the resource availability and run-time resources include information corresponding to the preferred resource requests, and wherein during execution of the application:
   preferred resource requests are read from the buffer, in response to determining an allocation checkpoint;
   resource availability corresponding to the read preferred resource requests is computed; and
   run-time resources for use in executing the parallel region based at least in part on the resource availability read from the buffer are determined.

17. The system as recited in claim 16, wherein determining the run-time resources comprises computing an average of one or more numbers of resources in the preferred resource requests and one or more associated numbers of resources in the resource availability.

18. The system as recited in claim 17, wherein the preferred resource requests and the resource availability are associated with one another by a parallel region identifier, wherein the one or more numbers of resources for each includes one or more of the following: a requested number of threads and a preferred assignment for each thread.

* * * * *